(12) United States Patent
Sommer

(10) Patent No.: US 6,370,453 B2
(45) Date of Patent: Apr. 9, 2002

(54) SERVICE ROBOT FOR THE AUTOMATIC SUCTION OF DUST FROM FLOOR SURFACES

(76) Inventor: Volker Sommer, Schwabsledler Weg 6, 13503 Berlin (DE)

(*) Notice: Subject to any disclaimer, the term of this patent is extended or adjusted under 35 U.S.C. 154(b) by 0 days.

(21) Appl. No.: 09/772,893

(22) Filed: Jan. 31, 2001

Related U.S. Application Data

(63) Continuation of application No. PCT/DE99/02276, filed on Jul. 22, 1999.

(30) Foreign Application Priority Data

| Jul. 31, 1998 | (DE) | 198 36 093 |
| Apr. 7, 1999 | (DE) | 199 16 427 |

(51) Int. Cl.[7] .......... G01C 22/00; G05D 1/00; G05D 1/02
(52) U.S. Cl. .......... 701/23; 701/24; 701/25; 701/26; 15/339; 15/319; 15/347; 15/331; 15/315; 15/323; 96/403; 96/404; 96/417; 96/418; 96/423; 134/18; 134/21
(58) Field of Search .......... 701/23, 24, 25, 701/26; 15/339, 319, 347, 331, 315, 323; 96/404, 403, 417, 418, 423; 134/18, 21; 250/221, 222.1, 338.1

(56) References Cited

U.S. PATENT DOCUMENTS

| 4,441,817 A | * | 4/1984 | Pryor | 356/375 |
| 4,470,226 A | * | 9/1984 | Williams | 51/416 |
| 4,515,479 A | * | 5/1985 | Pryor | 356/375 |
| 4,638,445 A | * | 1/1987 | Mattaboni | 364/513 |
| 5,023,444 A | * | 6/1991 | Ohman | 250/221 |
| 5,033,151 A | * | 7/1991 | Kraft et al. | 15/319 |
| 5,095,577 A | | 3/1992 | Jonas et al. | 15/315 |
| 5,199,996 A | * | 4/1993 | Jonas et al. | 134/21 |
| 5,551,119 A | * | 9/1996 | Worwag | 15/319 |
| 5,634,237 A | * | 6/1997 | Paranjpe | 15/319 |
| 5,677,836 A | | 10/1997 | Bauer | 364/424.027 |
| 5,696,675 A | | 12/1997 | Nakamura et al. | 364/242.027 |
| 5,995,884 A | * | 11/1999 | Allen et al. | 701/24 |
| 6,073,302 A | * | 6/2000 | Buscher | 15/339 |

FOREIGN PATENT DOCUMENTS

| DE | 1057154 | 8/1956 |
| DE | 2101659 | 6/1973 |
| DE | 2252493 | 10/1975 |
| DE | 4307125 A1 | 9/1993 |
| DE | 4340771 A1 | 8/1994 |
| DE | 4330475 A1 | 8/1995 |
| DE | 19614916 A1 | 11/1997 |
| EP | 0142594 B1 | 6/1989 |
| EP | 0382693 A1 | 8/1990 |
| EP | 0769923 B1 | 8/1998 |
| GB | 2038615 | 7/1980 |

* cited by examiner

Primary Examiner—William A. Cuchlinksi, Jr.
Assistant Examiner—Ronnie Mancho
(74) Attorney, Agent, or Firm—Birch, Stewart, Kolasch & Birch, LLP

(57) ABSTRACT

A self-moving device and method for the complete and full automatic examination of floor surfaces of all kind as well as for a particularly efficient suction of dust therefrom. In each case, the robot is controlled so as to explore the adjacent area and to detect the potential obstacles using special sensors before storing them in a data field. The displacement towards a new location is then carried out using the stored data until the whole accessible surface has been covered. One of the main constituent members of the robot includes an extensible arm that rests on the robot and on which contact and range sensors are arranged. When the robot is used as an automatic vacuum cleaner, an air flow is forced into the robot arm and the cleaning effect can further be enhanced by providing one or more circular rotary brushes at the front end of the arm. This device can essentially be used for domestic or industrial cleaning purposes with a view to replace traditional vacuum cleaners.

49 Claims, 10 Drawing Sheets

SERVICE ROBOT FOR THE AUTOMATIC SUCTION OF DUST FROM FLOOR SURFACES

This application is a Continuation of PCT International Application No. PCT/DE99/00276 filed on Jul. 22, 1999, which designated the United States, and on which priority is claimed under 35 U.S.C. §120, the entire contents of which are hereby incorporated by reference.

BACKGROUND OF THE INVENTION

Today commercial household vacuum cleaners resemble in function and handling basically the models from the beginning of the twentieth century, even if improvements to the suction power, noise emission and air-filters have been achieved during the years. The various models available on the market differ apart from their design mainly in the power of their engines, which in some cases can be controlled electronically, the noise damping and the quality of their filters.

The classical floor vacuum cleaner consists of an engine block on wheels connected with a tube and various nozzles. For the suction of floor surfaces, usually a rigid nozzle mounted on a telescope handle, which renders possible to clean an area of about 20 cm width, is used. As an alternative, the engine block can be integrated in the telescope handle. For smooth floor surfaces, most models have a short brush, which can be pushed out of the nozzle by means of a switch operated by hand or foot. Additionally, with some models, a nozzle with an horizontally rotating brush can be used to enhance the cleaning effect. The drive of this brush is realised electrically or indirect by the air stream.

DESCRIPTION OF THE RELATED ART

To enhance the cleaning effect, especially for the use with cleaning machines, an arrangement of several circular brushes, which by a planetary gear are put into multiple rotation, is described in the German patent application 1057154. Other known cleaning machines use two stationary circular brushes at the two front ends which the automatic vacuum cleaner in DE 43 07 125 A1 possesses to move dirt from the direct lateral area of the vacuum cleaner to a stationary suction nozzle.

In the German patent application DE-OS 21 01 659, a vacuum cleaner with a telescope suction arm with a circular profile is described, with a suction nozzle mounted at the end of the arm. The vacuum cleaner is not mobile, but can only turn within a certain angle by means of a rectangular positioned steering wheel. There are no sensors, only the lateral parts of the suction nozzle are seated rotatory by a spring to be able to avoid obstacles.

In the British patent application GE 20 38 615 A, a vacuum cleaner with remote control and a circular base on three wheels, two of which are driven wheels, is described. This vacuum cleaner has a stationary suction nozzle beneath the base. A method of steering the device or sensors are not contained in the patent application.

The patent application U.S. Pat. No. 5,095,577 describes a self moving vacuum cleaner, whose suction nozzle is mounted at the end of a suction tube which is rolled up on a cylinder and thus can be extended. The device is enabled by mechanical sensors and steering elements to follow the contour of a wall while extending the suction nozzle or rolling it up.

The same mechanism, but able to extend one or two suction nozzles rectangular to the moving direction of the device, is described in the patent application U.S. Pat. No. 5,199,996, though the vacuum cleaner is only moved in parallel courses respectively in courses rectangular to the prior courses.

A further method of controlling an automatic vacuum cleaner is contained in the patent application DE 43 40 771 A1. In this arrangement, the vacuum cleaner is guided along the inner contour of the surface to be cleaned, thus detecting the contours of the surface to be cleaned. Then, a micro processor compares the form of the surface to be cleaned with the previously stored contours to select the most appropriate cleaning program. For orientation, apart from optical and ultrasonic sensors on the surface of the vacuum cleaner, a magnetic field sensor is used to determine the direction.

In EP 01 42 594 B1 and DE 43 07 125 A1, a similar method of controlling is described, but with the additional capability of the vacuum cleaner to plan and perform independently parallel cleaning courses after one cycle to determine the contours of the surface to be cleaned, without the previous storing of a cleaning program for a certain room.

The patent application DE 196 14 916 A1 describes an automatically working moving robot, whose orientation is based mainly on the stereoscopic evaluation of the data of two video cameras. A concrete controlling method though is not described.

In the patent application EP-A-38 26 93, a method of controlling on the basis of a recursive algorithm is described for a suction robot, wherein the respective closer area around the suction robot is cleaned and the suction robot then by moving ahead and back, followed by a turn with a certain angle of turning, is moved to a new place until a given area is covered. To determine the respective new position, a systematic algorithm is utilised.

In the patent application U.S. Pat. No. 5,696,675, a moving robot with a lateral displaceable arm is described, which possesses a special construction with supporting wheels to support the suction arm and whose sensors are able to detect an obstacle for the arm and for the vacuum cleaner.

In the patent application U.S. Pat. No. 5,677,836, a device is described, comprising the transmission of the co-ordinates from one map to another map.

In addition to the deterministic controlling methods mentioned above, on the fair "DOMOTECHNICA 99", a self working vacuum cleaner was presented, which according to the patent application EP 0 769 923 B1 mainly is controlled stochastically. Here, the vacuum cleaner moves in a certain direction until an obstacle, which is detected by sensors, blocks its way. The vacuum cleaner turns away from the obstacle and continues its way in another direction, until a new obstacle forces it to change its course, and so on.

Despite the improvements in certain fields during the years, vacuum cleaning remains a time consuming and exhausting housework . Today's manual devices require frequent bending, sometimes the moving of objects as well as the strong rubbing of the suction nozzle. Apart from that, because of the inflexible suction nozzles, damage of delicate furniture may occur. When changing from smooth surfaces to carpet-covered surfaces, each time the suction nozzle has to be switched manually to achieve the best cleaning effect. If narrow places have to be vacuumed, a troublesome change of the suction nozzle is required.

The known methods of controlling autonomously working vacuum cleaners show the following disadvantages:

Methods of controlling, which require a manual route planning, are to complicated and very inflexible, because especially in a household, the floor surface which is to be cleaned changes continuously because of the moving of objects.

Methods of controlling, which before starting the actual vacuum cleaning process detect the border lines of the floor surface which is to be cleaned and determine their cleaning courses with this information, are overstrained, if many obstacles, e. g. furniture, force them to frequent evading movements. Apart from that, because of the detection of the border lines, it takes a comparatively long time until the actual suction process starts and the method only works in closed room areas. Moreover, it is not possible to define a certain starting point for the vacuum cleaner, from where the cleaning process is to be started.

Exclusively stochastic methods of controlling work unsatisfactorily as well, because certain areas are covered very often whereas other areas are covered rarely or not at all, so that a non-uniform cleaning effect is achieved. The cleaning process also lasts very long and there is no criterion of ending the process.

In the recursive method of controlling, described in the patent application EP-A-38 26 93, the vacuum cleaner has to cover very far distances because of the continuous moving ahead and moving back, which leads to long vacuuming times and to a non-uniform covering of the area. A starting point can be indeed determined, but the vacuum cleaner moves away from this point in a certain direction without completely cleaning the direct environment before.

The self moving vacuum cleaners controlled by the methods described above are not suitable to replace the manual vacuum cleaners because of the following reasons:

Powerful vacuum cleaners possess a bulky form and cannot be used in narrow spaces, also because the damage of delicate furniture cannot be excluded. Moreover, except from complicated driving methods, several and complicated sensors are used which render the devices susceptible and very expensive. To improve the accessibility, recently very low devices with a circular base have been developed. But this limits the possible size of the batteries and so the reach and the power of the vacuum cleaner. Also, many areas in corners and niches and along the edges of furniture cannot be cleaned, because they are not accessible for the vacuum cleaner. Vacuum cleaners relying on a wire based power supply, in principal because of the necessary connecting cable are not flexible enough to be able to clean efficiently housing spaces with numerous obstacles.

SUMMARY OF THE INVENTION

Thus, the invention is based on the task to provide a flexible cleaning system, which on the one hand is able to adapt to any kind of floor surface with any kind of obstacle, and on the other hand avoids unnecessary multiple cleanings of certain areas, while other areas are not sufficiently covered or are not covered at all. Apart from that, the cleaning process should he enabled to start at any point determined by the user without having to previously detect the contours of the room.

To provide a serious alternative to commercial vacuum cleaners, the device controlled by the method should cover every floor area as well as edges of furniture and narrow niches, while a high cleaning effect is necessary and damages have to be excluded. The device has to be big enough to contain a sufficient capacity of batteries. By the means of adequate insulation, most of the produced noise can be damped. Moreover, the vacuum cleaner should be constructed as simple as possible, be robust and dispense with complicated sensors to render possible a low cost production.

According to the method of automatic controlling a self-moving device, especially a vacuum cleaner, with range-respectively contact-sensors, a closer area around the device is individually determined and scanned, e.g. by a movable arm. The device is then moved to a respective new position until no position can be selected anymore. At this, the determination of the closer area and the selection of the position is realised mainly on the basis of the information of the surroundings, which is stored in a map (vacuuming field) and updated in each step, at this to determine the respective next position. An optimising of all positions, which have been stored and can be approached by the device, is performed by calculating and comparing for each of these positions certain evaluation parameters like distances or areas in the reach of a possible new position, which have not yet been scanned, and by selecting the position with the best evaluation result.

The scanning of the closer area is realised, starting with the retracted state of the arm, by repeated turns to the left and the right with an increased length of the arm at each turn, until a given maximum arm length is reached and the arm is then, following a last turn, retracted again.

The fully automatic method of controlling, especially of controlling a self moving vacuum cleaner, with range and contact sensors, which was developed to solve the described problems, shows the following features:

Around the device, a closer area is determined, which is scanned by sensors, and at the borders of this closer area, possible new positions for the device are stored. Then, after selection of a position stored in the current or previous step, dependent on the degree of accessibility, on an assigned priority and under consideration of the existence of not yet scanned areas in the range of a possible new position, the selected position is approached and then the described sequence of steps is repeated until a given area is completely covered or no new positions can be selected anymore.

The floor surface scanned by the sensors is stored in a two dimensional data field to mark herein by means of certain states obstacles detected during the scanning, free areas and possible new positions for the device. This data field, in which successively a copy of the accessible floor surface with the contours of each obstacle within and the limiting borders of the floor surface is generated, is used to determine the controlling parameters for the device and to control the already covered area.

Further advantageous possibilities of the method of controlling are as follows:

The closer area can be determined by the reach of the sensors, which are mounted on the device flexibly or stationary. At this, sensors can be used which are sensitive to direction and possess distant effect, or simple contact respectively range sensors, which are guided above the surface which is to be scanned by a suitable mechanical arrangement. But the scanning of the closer area can also be performed by emulating the effects of sensors with distant effect or of flexible sensors by moving the complete device, so that the device detects the maximum closer area within reach including potential obstacles with sensors without distance effect. In this case, any area relative to the position of the device can be defined as a closer area.

When using sensors which do not provide any information about the direction, after the detection of an obstacle its exact position is determined by consideration of the direction of detection.

To limit the number of stored positions, after the scanning of the closer area, new positions are only stored where no obstacles have been detected and where no areas border, which have been already scanned from a previous position of the device. This condition is realised most simply by storing only new positions at those borders of the closer area which are marked in the data field as not yet scanned.

While storing a point (x,y) into the data field with the dimensions x_max and y_max, for negative co-ordinates the transformation into a positive range of co-ordinates, e. g. by forming x_max—|x| respectively y_max—|y| is realised.

When scanning again an area already marked in the data field, the states of this area are updated according to the new sensor data. Thus it is realised, that because of the overlap of the scanning areas and especially if obstacles are located in an area already scanned, the stored information about the scanned area will always be updated.

When selecting a new position for the device, only such positions are taken into consideration, which are marked in the data field as not yet scanned. This criterion provides a simple but effective method to consider the not yet scanned areas in the range of a new position: If in the meantime a position is marked as already scanned since its storage in the data field, it can be deduced that the surrounding areas as well have been covered because of the usually compact closer areas. Because of that, such a position can be deleted, since it does not have to be approached anymore.

When storing new positions, different priorities for the positions can be assigned, e. g. dependent on their location and nearness in comparison with other positions. When selecting a new position for the device, only such positions are considered whose priorities are not inferior to that of a new position already preliminarily selected in the current step.

When selecting a new position, only such positions are considered, which are located within a certain partial area. This partial area will be modified during the process, if within the current partial area no new position can be selected. This method renders possible an indirect influence on the movement of the device, for instance to ensure that the device mainly covers coherent areas.

When selecting a new position, the distance and the direction from the current position can be used as a criterion of valuation.

Moreover, when selecting a new position for the device, by evaluating the data field it can guaranteed, that the new position can be reached by the device on a direct route, allowing only areas to be traversed which have already been scanned and which are not marked as an obstacle.

Furthermore, it is possible when selecting a new position to consider the covered distance since the storage of a possible new position, to limit the influence of backlash. This can for instance be realised by marking as free an additional safety distance at the borders of the area which is to be traversed, whose width depends on the covered distance, when checking the possible reach of a position in the data field.

After selecting a new position by evaluating the data field, the shortest route within the already scanned area under avoiding obstacles is determined and the device is moved along this route.

The device can be set back on any previous position and when setting back the device over several positions, certain positions in between can be skipped, if a checking of the data field shows that the device does not have to traverse areas marked as obstacle during its movement.

If an unexpected obstacle blocks the movement of the device, it will detect the contours of the obstacle by scanning it with the sensors. Since during the movement of the device usually no new scanning of the route occurs, because at this only areas are traversed, which are marked as free in the data field, the device can meet unknown obstacles caused by the movement of objects or maybe because of backlash. In this case, the movement of the device is interrupted, the closer area is scanned to update the stored data, and then a new position is selected.

After approaching the new position, the new closer area is determined by evaluating the data field, so that only a small overlap with already scanned neighbored areas occurs.

Especially advantageous for the use of the invention as a vacuum cleaner is the fact that during the scanning, at the same time the floor surface is cleaned.

To ensure this, the scanning can be realised by a movable arm, so that not yet scanned areas are always covered at first by the front end of the arm. When contacting an obstacle, the arm is guided along the detected obstacle at the smallest possible range. Especially advantageous can be the selecting of the closer area around the device in form of the sector of a circle, with the scanning being performed by repeated turns of the device to the left and the right with an increased length of the extensible arm at each turn. To avoid the repeated scanning of the same obstacle, the arm can be shortened in the range of those angles where an obstacle has already been detected.

By evaluating the information in the data field it is ensured that the cleaning of the floor surface is only conducted in areas which are marked as not yet cleaned in the data field.

A device suitable for the methods of the invention, which besides a suction unit can of course contain other cleaning units, e. g. for sweeping, cleaning by steam or by spray or which can be used alternatively for other purposes such as lawn mowing, search of objects or controlling purposes, shows the following substantial features, which can be combined:

The device with propelled wheels and steering wheels respectively propelling wheels which can be steered and sensors and an extensible arm is characterised by the fact that apart from two propelled wheels the lower front end of the arm (head) is used as a third support, which rests on rollers, balls, wheels or bristles.

The device with propelled wheels and steering wheels respectively propelling wheels which can be steered and sensors and an extensible arm with a head positioned at its front end is characterised by one or several rotating circular brushes positioned at the head.

The device with propelled wheels and steering wheels respectively propelling wheels which can be steered and sensors and an extensible arm is characterised by range or contact sensors at the arm to detect obstacles, which by moving the arm and turning the device can cover the closer area and detect obstacles for the movement of the arm as well as obstacles which only impede the movement of the device.

The device with propelled wheels and steering wheels respectively propelling wheels which can be steered and sensors is characterised by the fact that the drives are connected elastically with the respective wheel, e. g. by means of a worm drive, with the displacement of the drives caused by the blocking of the device by an obstacle being detected. This feature renders it possible to renounce on an additional outer contact sensor, which would have to surround the device completely and which would be mechanically complicated.

Additional advantageous features of the device are characterised as follows:

The drive of the circular brush(es) is realised via a movable shaft by a motor which is positioned at the base of the device.

Each brush is surrounded by a thick ring of soft bristles which are adjusted diagonally towards the outer part of the brush to remove dust from the edges of furniture and to avoid damage. Moreover, the brush can possess bristles which are adjusted diagonally towards the inner part of the brush and can solve dirt from the floor, support the device and in addition to that, are able to lift the head of the device at small steps e. g. at the edges of carpets.

If several circular brushes are used, the axes can be arranged and propelled so that the brushes move the dirt in the direction of the suction nozzle beneath the head. Especially advantageous is an already known arrangement as described in the German patent application 1057 154, in which the brushes are put into self rotation by means of a planetary gear while at the same time circulating under the head.

Special sensors at the head detect obstacles for the movement of the arm. A sensor for this purpose can advantageously be constructed in the form of two electrical conductors positioned within a short distance to each other around the head of the arm, of which the outer one is pressed elastically against the inner one when touching an obstacle, thus closing an electrical circuit.

Other sensors at the head detect obstacles for the movement of the device which do not block the arm. For this purpose, a range sensor can be used which measures the clear height above the head, using e.g. ultrasonic or electromagnetic waves. Additionally, a sensor, e. g. in form of a mechanical push button or contact-free, can detect steps in the floor surface beneath the head to avoid tipping of the device. The movable arm advantageously is constructed as a telescopic arm with a rectangular profile to provide, when used as a vacuum cleaner, a big sectional area for the air stream while constructed as low as possible.

If the device is not supported at the front end of the arm, it is advantageous to construct the telescopic arm so that at its rear end it is mounted rotating around a horizontal axis respectively vertically flexible to guarantee a good floor contact of the head. Also in this case, an additional support with an integrated ball to roll off can be positioned under the front end of the arm, which allows any lateral movement.

By shifting of weight, the resting pressure of the head can be varied.

After releasing of the blocking sensor, the device is advantageously placed back until no further blocking is detected by the sensor. Then follows a repeated advancement, though with reduced speed, to distinguish between real and fake obstacles. If the sensor releases the first time because of a real obstacle, it will release again at reduced speed. If the cause is only a step in the floor surface which can be overcome, e. g. the edge of a carpet, or an increased frictional resistance of the brush, the reduced speed causes a reduction of the dynamic forces and the frictional forces, thus preventing a new release.

By means of the example of a vacuum cleaner, the process of the method of the invention is explained in detail, while for better understanding, the construction of the device is described at first. The method of the invention can of course be applied independent of the device described in the following and also with any other suitable device.

BRIEF DESCRIPTION OF THE DRAWINGS

The figures explain the embodiment of the invention as described in the following and are given by way of illustration only and thus are not limitative of the present invention, and wherein.

DETAILED DESCRIPTION OF THE INVENTION

Driving Means and Concept of Movement

Figure 1:
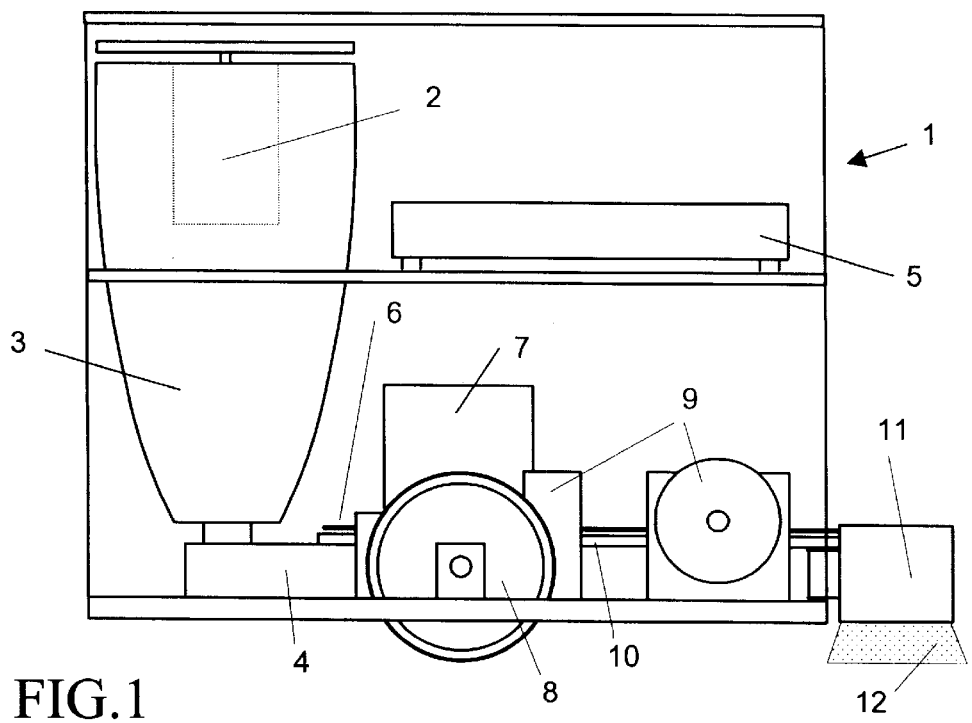
FIG. 1 illustrating the elevation of the vacuum cleaner.
Figure 2:
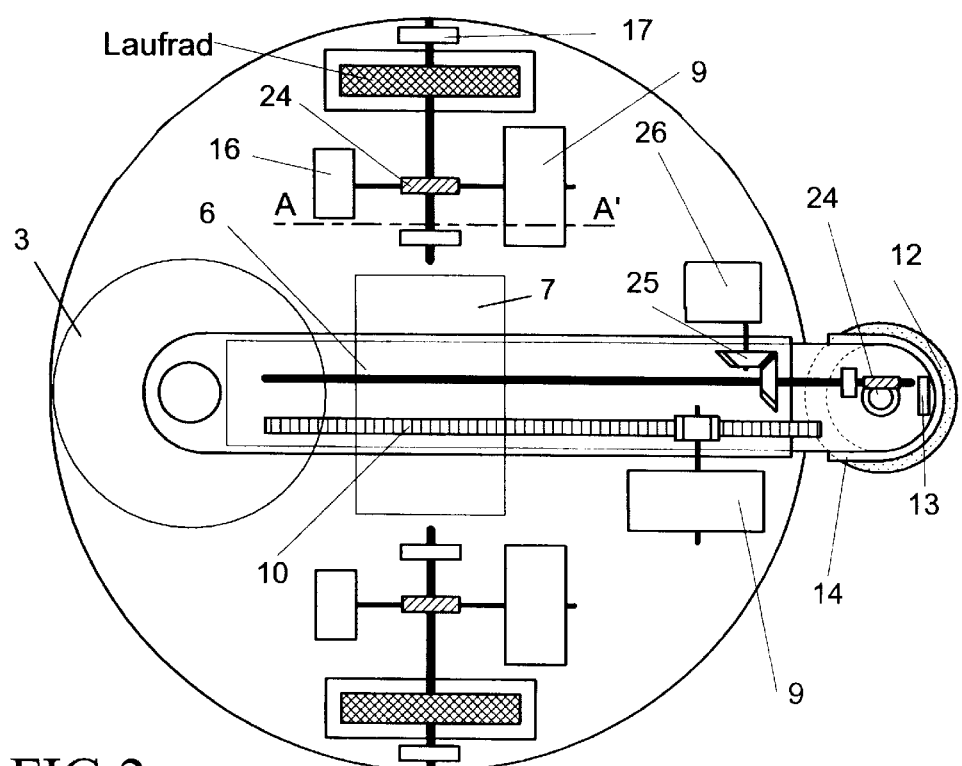
FIG. 2 illustrating the top plan view of the vacuum cleaner.

FIG. 1 shows the elevation of the vacuum cleaner 1 while FIG. 2 depicts the top plan view upon the lower level of the vacuum cleaner 1 with removed dust arrester collecting container 3.

The drive is realised by two step motors 9, each of which is propelled by means of a worm drive 24 with a gear reduction of approx. 1:30. A rubber covered wheel 8 is provided for each motor 9. By positioning the wheels 8 on the symmetrical axis of the circular base, by means of the two motors 9, as well the forward thrust (same direction of turning) as the turning around the center of the vacuum cleaner 1 (opposite directions of turning) can be realised. As a third support, the cleaning brush 12 is used. The cleaning brush 12 is mounted at the front end of the extensible suction arm 4.

By positioning the comparatively heavy battery 7, which provides every motor 2, 9, 26 a s well as the electronic hardware 5 with energy, on the basis of the cleaner body, it is realised that the vacuum cleaner 1 is provided with a slight off-balance towards the front end, so that a stable support of the vacuum cleaner 1 is always guaranteed.

This concept on the one hand grants a very simple mechanical construction, because no additional supporting wheel is necessary, and on the other hand, the suction brush 12 always is in close contact to the floor surface, independent of uneven areas of the floor covering.

Extensible Suction Arm With Rotating Brush

An essential element of the construction of the vacuum cleaner 1 is the extensible suction arm 4, see FIGS. 1 and 2, which renders possible the access to not easily accessible areas of the floor, e. g. under closets or in small niches.

The suction arm 4 possesses a rectangular profile and consists mainly of two hollow bodies fitted into each other like a telescope which are made of synthetic material and through which the air stream is guided.

The length of the suction arm 4 is also controlled by a step motor 9, which drives a toothed rack 10 mounted at the front of the extensible inner part and Which allows an exact positioning.

At the front end of the arm 4, a rotating suction brush 12 is mounted, which is set rotating by a worm drive 24. The worm drive 24 is mounted on a shaft 6 with a square profile, on which a cone shaped cog-wheel 25 can glide while transferring the momentum. By a suitable support at the outer side and by a second cone shaped cog-wheel at the inside in an angle of 90°, the first cog wheel is axially fixed at the base of the vacuum cleaner 1. By this arrangement it is realised that the brush 12 can be turned independent of the current length of the suction arm 4. Apart from that, the suction arm 4 can be constructed very flat to clean the floor under low furniture. As a drive for the brush 12, a commercial geared motor 26 is used, with which a turning frequency of the brush 12 of about 0.5 Hz is adjusted.

The cleaning effect is realised by guiding the dust into a collecting container 3 by means of the brush 12 within the suction arm 4 and by the air stream which is generated by an electric motor 2 with a power of approx. 50 W.

The high suction efficiency partly results from the fact that the even-surfaced and aerodynamic favorable guiding of the air stream causes only little turbulence and so only small losses.

Figure 3:
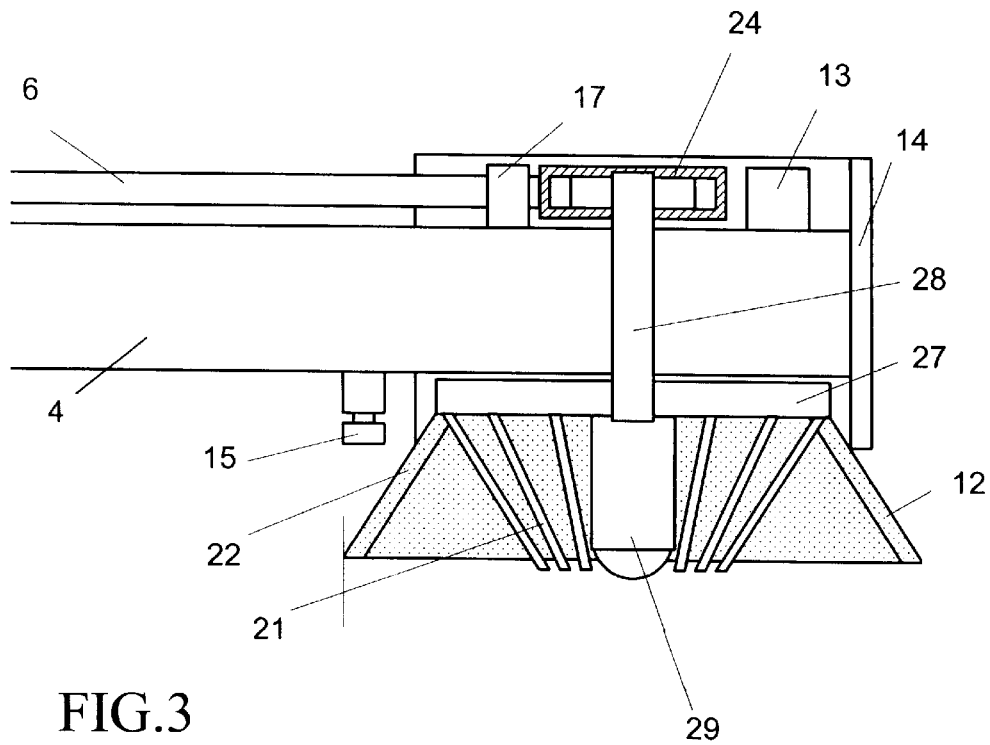
FIG. 3 illustrating the longitudinal sectional view of the suction head.
Figure 4:
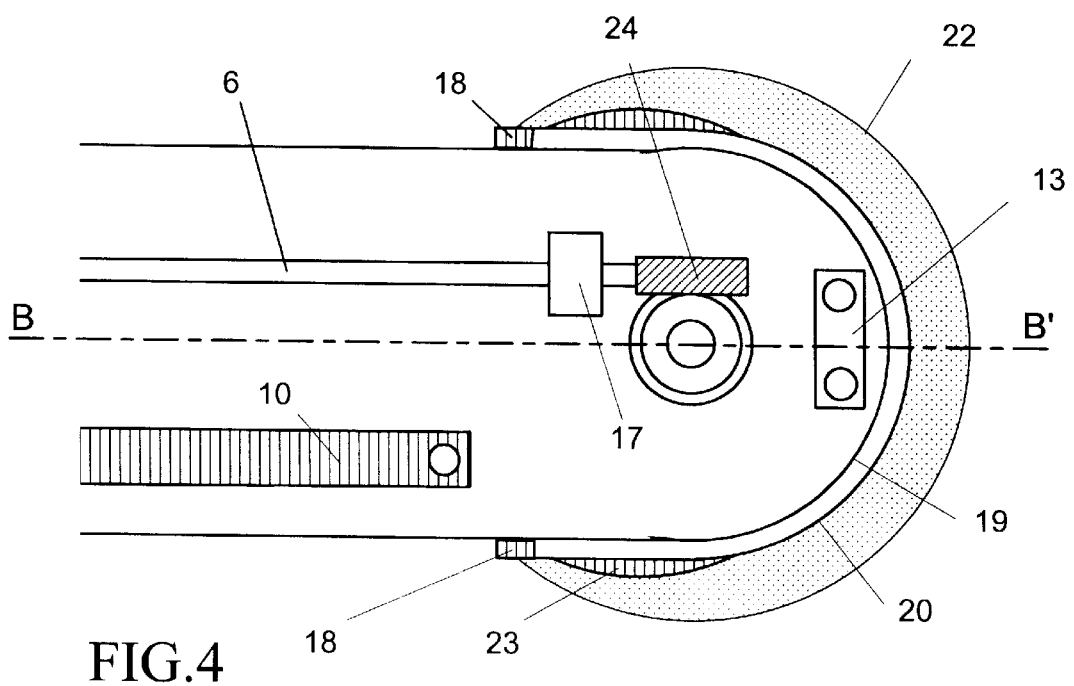
FIG. 4 illustrating the top plan view of the suction head.

An additional and most important improvement of the cleaning effect is realised by the cleaning brush 12 which rotates around its vertical middle axis, and whose longitudinal section is illustrated in FIG. 3. The position of the section B—B is shown in FIG. 4. This brush 12 bunches the air stream and loosens dust and other foreign substances mechanically of the floor, mainly independent of the kind of floor covering.

The so-called brush-wheel 27 is connected by an axis 28 with a cog-wheel above the suction arm 4, in which the worm drive 24, which is mounted at the end of the shaft 6 with the square profile, gears in. The brush-wheel 27 is constructed as a spoke-wheel as to impede the air stream which is passing through as little as possible.

The bristles are all mounted at the outer edge of the brush-wheel 27, with the bristles 21 which are adjusted diagonally towards the inner axis being manufactured comparatively stiff and showing a sufficiently big distance from each other as to let the air stream pass between them unimpededly. These bristles 21 support the vacuum cleaner 1 at the front and guarantee that the very soft bristles 22 which are adjusted diagonally towards the outer side of the brush just make contact with the floor covering. Apart from the thus realised decrease of the frictional resistance, an additional advantage is realised by the fact that the outer bristles 21 are arranged very densely and that the air stream can only pass through the cleft to the floor, so that an effective radial jet effect is produced.

Optionally, for very soft floor coverings, an additional support 29 made of synthetic material can be positioned under the brush-wheel 27 as a lengthening of its own axis to prevent a too deep sinking of the suction head 11. In this support 29, a roller ball, which can be turned freely on the floor, is integrated to minimise the loss because of friction when moving the arm 4, see FIG. 3.

The stiff bristles 21 which are adjusted diagonally towards the inside of the brush have another important task, because they render possible an uncomplicated transition while passing small steps in the floor covering, e. g. at the edges of carpets. Here, the outer soft bristles 22 are pressed towards the inside of the brush when moving the suction arm 4, with the suction head 11 being slightly lifted because of the elasticity of the bristles. This effect is increased by the diagonal adjustment of the inner supporting-bristles 21, so that the suction arm 4 can glide over the step.

The resistance of the bristles when moving the vacuum cleaner 1 on carpet or over steps also is distinctly decreased by the vertical turning of the brush 12. The turning frequency has to be adjusted to the lateral moving speed of the suction head 11 to guarantee the optimum rolling off of the suction head 11. This effect is independent of the current direction of moving of the vacuum cleaner 1 because of the radial symmetry of the brush 12.

Compared to usual forms of suction heads and suction brushes, a main advantage of the above described construction lies in the fact that especially in the direct environment of the suction head 11, e. g. while vacuuming the edges of furniture and skirting boards, a high cleaning effect is realised, while damage is excluded by the use of the soft outer bristles 22.

Altogether, by combination of all these factors it is realised that despite the necessarily limited capacity of the motor due to the power supply by batteries, the cleaning effect is much better than that of commercial vacuum cleaners with distinctly higher connected load.

Orientation of the Vacuum Cleaner With Sensors

The orientation of the vacuum cleaner 1 is based on the calculation of the current suction position by means of the already covered distance. Because of the exact stepwise steering and the statistical occurrence of possible mistakes in positioning, a preciseness of location can be reached, which even after long distances, covered while vacuum cleaning a room, in combination with the sensors is absolutely sufficient.

To detect obstacles with high local precision, the suction head 11 scans the floor area in front of it by turning the vacuum cleaner 1 and by an appropriate extension of the arm, see chapter 'Vacuuming of a sector'. At this it is guaranteed by the circular symmetry of the vacuum cleaner 1, that while the device is turning, only the suction head 11 can meet an obstacle.

Altogether, three sensors 13, 14, 15 are required for this task. The most important function falls to the share of the contact sensor 14 at the suction head 11, whose construction is illustrated in FIG. 4. This sensor 14 is used for detecting the touching of obstacles while turning the arm 4 or moving it in a longitudinal direction.

It consists mainly of two strips 19, 20 made of synthetic material, which surround the suction head 11 and are kept within a distance of only a few millimetres of each other by means of two lateral distance-blocks 18. While the inner strip 19 is permanently connected with the suction head 11, the outer strip 20 is supported only by the distance-blocks 18 and consists of a very thin elastic synthetic material, to obtain the effect of a soft spring.

The inner sides of the strips 19, 20, which are turned towards each other, are covered with a conducting material and joined by means of connecting wires with the electronic hardware. Usually, these surfaces, which provide the contacts are isolated against each other by means of the isolating distance-blocks 18 and the surrounding air. But if the suction head 11 meets an obstacle, the outer strip 20 will be pressed against the inner strip 19 so that an electrical circuit will be closed. Upon such contact, the direction in which the obstacle is met is not important.

The two bulges 23 at both sides of the suction head 11 are used to reliably detect lateral touches when turning the vacuum cleaner 1. These bulges 23 convey the lateral pressure on the outer elastic strip 20, which then is pressed against the inner strip 19.

FIG. 1 illustrates that the contact sensor 14 covers the complete height of the suction head 11 and also extends a far way down to be able to detect possible obstacles, which can block the movement of the suction head 11.

Though the contact sensor 14 is not capable to detect the direction of an obstacle, this information always can be gained because the direction of the movement of the suction head 11 is known.

The second very important sensor is the so called height sensor 13 at the upper front end of the suction head 11, see FIGS. 3 and 4. This sensor 13 has the task to detect obstacles, which do not impede the suction arm 4 and suction head 11, but whose clear height is not sufficient for the whole vacuum cleaner 1 to pass under them.

For this purpose, a commercial infrared range sensor is used, whose release range is exactly adjusted to the height of the vacuum cleaner 1 minus the height of the suction head 11. This sensor 13 possesses a high lateral accuracy, so that even at obstacles with a vertical distance of about 30 cm, a lateral local precision of only a few centimetres is obtained.

As a third sensor, a so called step sensor 15 is provided, see FIG. 3, to detect major steps in the floor covering, e. g. at stairs, to prevent a toppling over of the vacuum cleaner 1.

This sensor 15 consists of a sensitive switch, which is mounted shortly behind the suction head 11 at the lower edge of the suction arm 4, with the distance between sensor 15 and floor measuring about 1 cm on even surfaces.

If the suction head 11 is moved over a step with a vertical downward displacement, which has at least the same distance as between sensor 15 and floor, the suction arm touches down with the switch which releases the sensor.

The sensors 13 to 15 described above are sufficient to be able to definitely control the vacuum cleaner 1 under normal conditions with the method described in the chapter 'Automatic controlling of the vacuum cleaner'.

In spite of that, by moving of objects in areas already vacuumed, it cannot be excluded, that the vacuum cleaner 1 meets obstacles when moving.

To be able to mark an obstacle for the controlling program in this case as well, the power transmission from the step motors 9 to the two propelling wheels is endowed with a mechanical blocking sensor 16 for each wheel.

Figure 5:
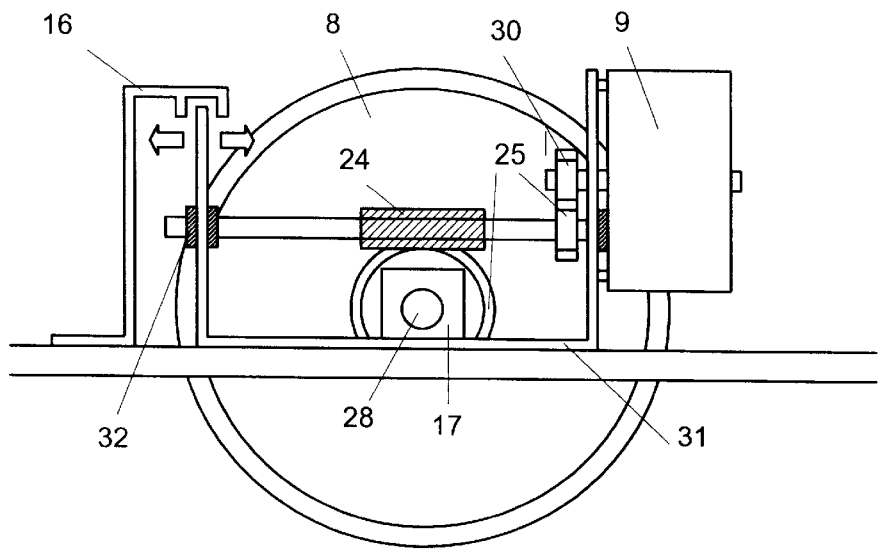
FIG. 5 illustrating the driving means with blocking sensor.

To illustrate the function of the blocking sensor 16, one of the step motors 9 is pictured in FIG. 5 in detail. This view is taken along section 'A—A' in FIG. 2. The pinion 30 of the step motor 9 transmits its momentum on a cog-wheel 25 which propels a worm drive. The shaft, on which cog-wheel 25 and worm drive 24 are mounted, is connected with the elastic mounting support 31 by axial rings 32 so that no axial movement of the shaft in relation to the mounting support 31 is possible and so the turning of the shaft is transmitted by means of the worm drive 24 in the turning of the wheel 8.

However, the propelling unit is no rigid system, because the combined mounting support 31 of shaft and step motor 9 consists of elastic material, which will permit slight axial displacements of the shaft, if during the turning of the motor a blocking of the vacuum cleaner occurs.

This displacement of the bearing 17 also closes an electrical contact as illustrated in FIG. 5, which is evaluated by the controlling electronic hardware.

The presented realisation of a blocking sensor 16 compared with rigid systems possesses the advantage, that during a sudden blocking of the vacuum cleaner, no great forces occur, which could cause damage. Because of the elasticity of the mounting support 31, a gradual increase of the propelling forces at the shaft occurs, until the blocking sensor 16 releases.

By changing the degree of rigidity of the bearing 17, the elasticity of the drive can be adjusted individually to the weight of the vacuum cleaner 1 and the dynamic forces.

Automatic Controlling of the Vacuum Cleaner

Description of the Controlling Method

Figure 6:
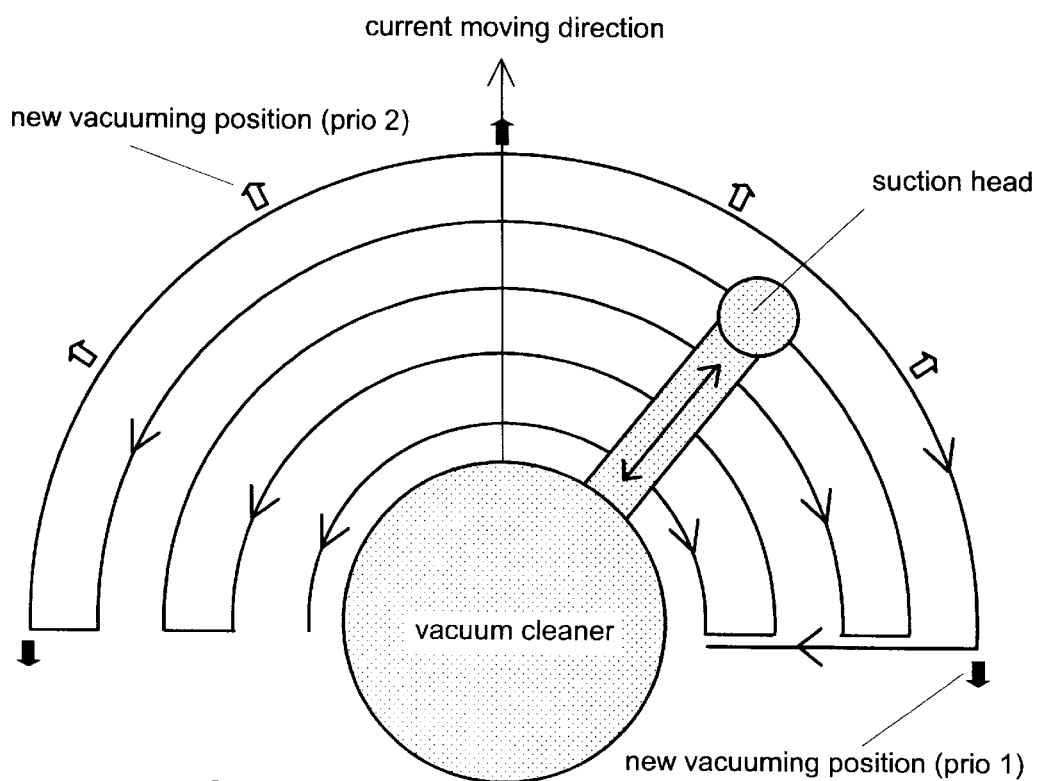
FIG. 6 illustrating the motion control while vacuuming sectors.

The controlling of the vacuum cleaner 1 is realised that, starting from the current position and in relation to the previous direction of movement, a sector with a maximum of ±90° is vacuumed in a meandering form, see FIG. 6. At first, the vacuum cleaner turns to the left maximum position. Then follows a turn to he maximum right, a lengthening of the suction arm 4 in the size of the diameter of the suction head, and then the turning back to the left maximum position. This procedure of movement is repeated until the suction arm 4 has reached its maximum length, after which it is drawn back completely when the last turn to the right has been finished.

Figure 7:
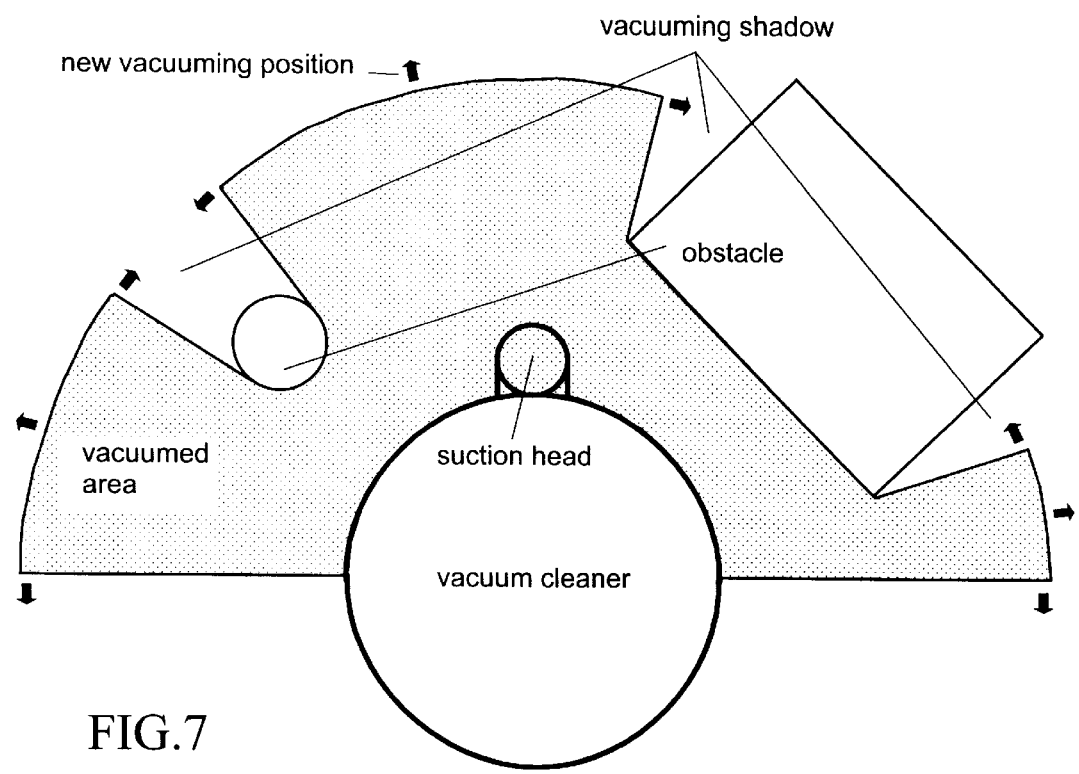
FIG. 7 illustrating the sectors of vacuuming when obstacles occur.

The described controlling of movement is automatically adjusted. If obstacles occur during the turning or the movement of the arm, see the chapter 'Vacuuming of a sector'. In FIG. 7, a limited sector area is illustrated, which can be covered by the suction head 11 if objects impede the movement. Thus, so called vacuuming shadows may occur, which the suction head 11 cannot reach because of the blocking of the turning of the suction arm 4.

Apart from this vacuuming shadows, further free border areas of the currently vacuumed sector are marked, see next chapter, and so marked as possible new positions for the vacuum cleaner. Out of all these positions, after finishing the vacuuming of a sector, the next vacuuming position is selected and approached, see 'Determination of a new vacuuming positions'.

Figure 8:
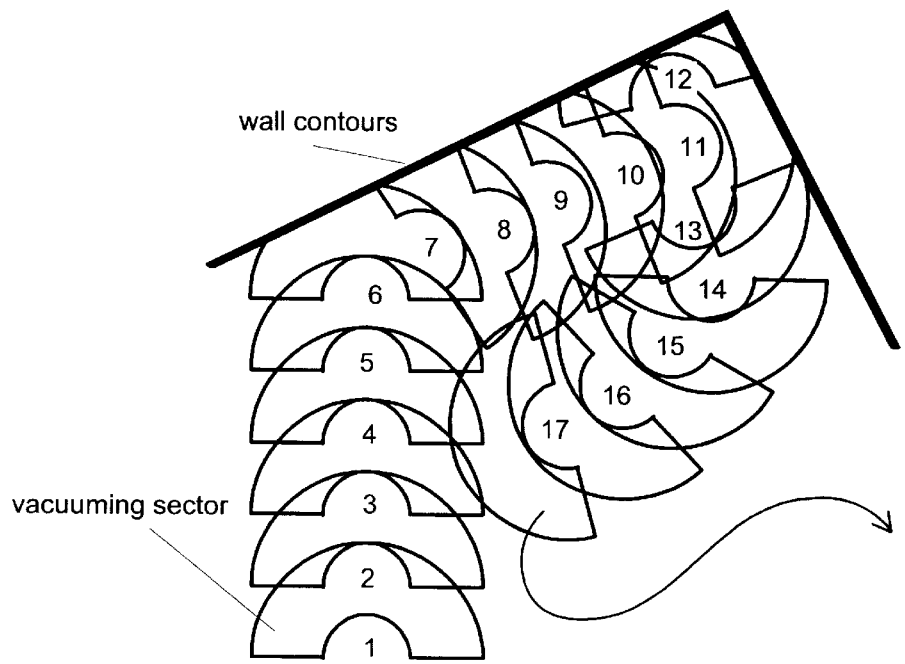
FIG. 8 illustrating the sequencing of vacuuming sectors.

FIG. 8 illustrates by means of the example of the corner of a room, how by concatenating single vacuuming sectors, areas with any contour can be cleaned completely (in this example all sectors possess the maximum opening angle of 180°). By means of overlapping the sectors, some areas are cleaned several times, which additionally increases the cleaning effect and compensates possible inaccuracies of the position of the vacuum cleaner.

To increase the reach of the vacuum cleaner with one charge of the batteries, the suction engine, which is the biggest consumer of power, runs only while vacuuming a sector and not when a new vacuming position is approached.

Marking of the Cleaned Areas

For the global orientation of the vacuum cleaner, the whole area which is to be cleaned is mapped in an electronic data field, the so called vacuuming field, wherein the different states which can be assigned to an area element are stored. This two dimensional information is used to mark new cleaning positions, to determine the route to these positions and for the determination of the vacuuming sector.

The following four states can be distinguished:

State 0 "unvacuumed"

This state is the default-value in the cleaning field when starting the vacuum cleaner and is overwritten as soon as the suction head has covered the respective place for the first time.

State 1 "vacuumed"
  This state is assigned to all area elements of the vacuuming field, which have already been covered by the suction head and which do not present an obstacle for the movement of the vacuum cleaner.
State 2 "obstacle"
  This state is used to mark obstacles, which have been detected by the sensors. A field marked with this state cannot be traversed by the vacuum cleaner when approaching a new cleaning position.
State 3 "possible new cleaning position"
  With this state, while cleaning a sector, a border field, which before must exhibit the state 0, is marked as a possible new cleaning position. If the area later on is covered by the suction head, the field will obtain the state 1 or 2. When controlling a possible new vacuuming position, state 3 shows that the respective area has not been vacuumed before.

To map the real area which has to be cleaned in the vacuuming field, a two-dimensional screen is used. At this, the local precision in x- or y- direction amounts to 1 cm each and thus is sufficiently exact for the precision of detection of the sensors. Since for the four different states only two bits are necessary, it is possible to map with this resolution an area of 10×10 m² into a memory size of only 250 kBytes.

Figure 9:
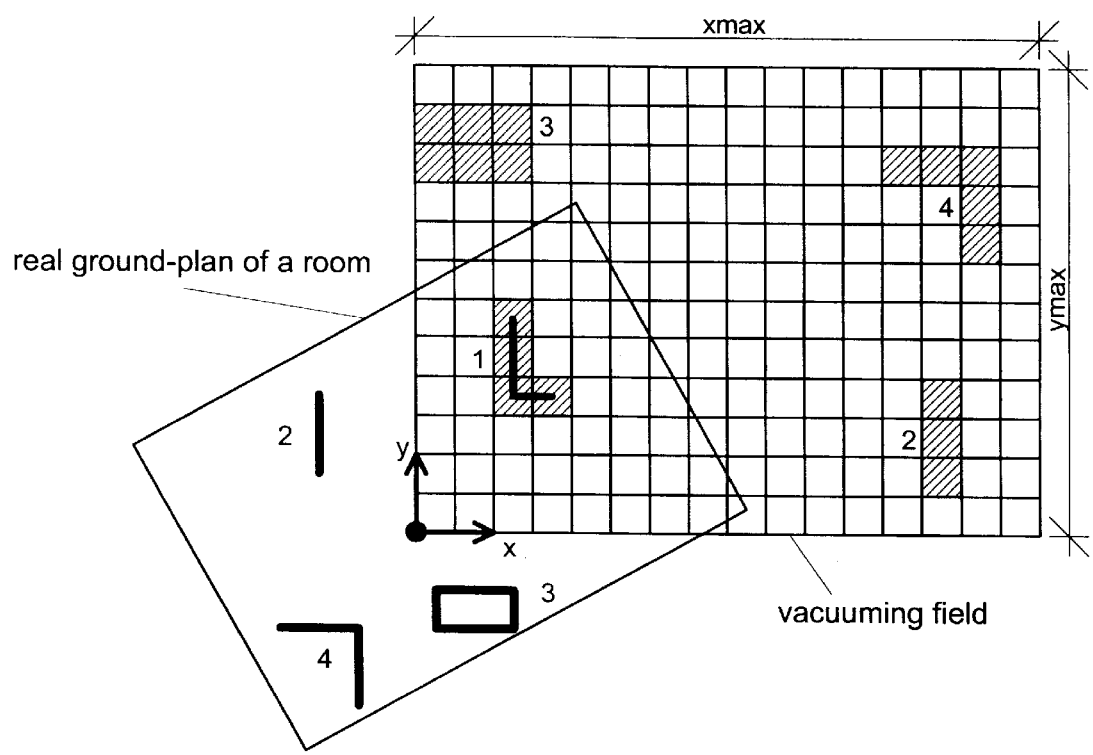
FIG. 9 illustrating the storage of the cleaned areas.

A possible problem when minimising the storing requirements is caused by the fact that at the beginning of the cleaning procedure, the vacuum cleaner is started at any place of the room. From this origin, for x and y may occur positive as well as negative co-ordinates, while the latter cannot be taken over directly into the vacuuming field. To solve this problem, a transformation of co-ordinates is carried out, see FIG. 9:

Each negative value for x respectively y is mapped on xmax—|x| respectively ymax—|y|, with xmax and ymax defining the maximum dimensions of the vacuuming field for x and y, which limit the range of movement of the vacuum cleaner.

Because of the transformation, field areas with at least one negative co-ordinate, are mapped in a shifted way in the vacuuming field.

During control of the movement, it is supervised that the amount of the maximum positive and the maximum negative vacuuming distance from the origin in the directions x and y does not exceed the given values for xmax or ymax. If this is not the case, the processing of the program will be interrupted with an error message. Since the suction head moves rather continuously, new states in the cleaning field will always be assigned if a distance of 1 cm has been covered. This includes that the areas below the outer radius of the suction head are taken into account in the form of a semi-circle in relation to the respective direction of movement of the head.

An exception of this rule of marking is made for the sensors for height and steps: If these sensors detect an obstacle, only the area in the vacuuming field which is positioned directly under the respective sensor, will be marked.

Description of the Controlling Method

In the flow charts described in the following, the following notation is used for the illustration: Beginning and end respectively jumping back to the previous flow chart are marked by a circle. Actions are symbolised by rectangles, with symbols marked by shadows meaning that the respective action is detailed in a separate flow chart. Hexagons with two lateral peaks have the meaning of a decision with the two possibilities 'yes' and 'no'.

Figure 10:
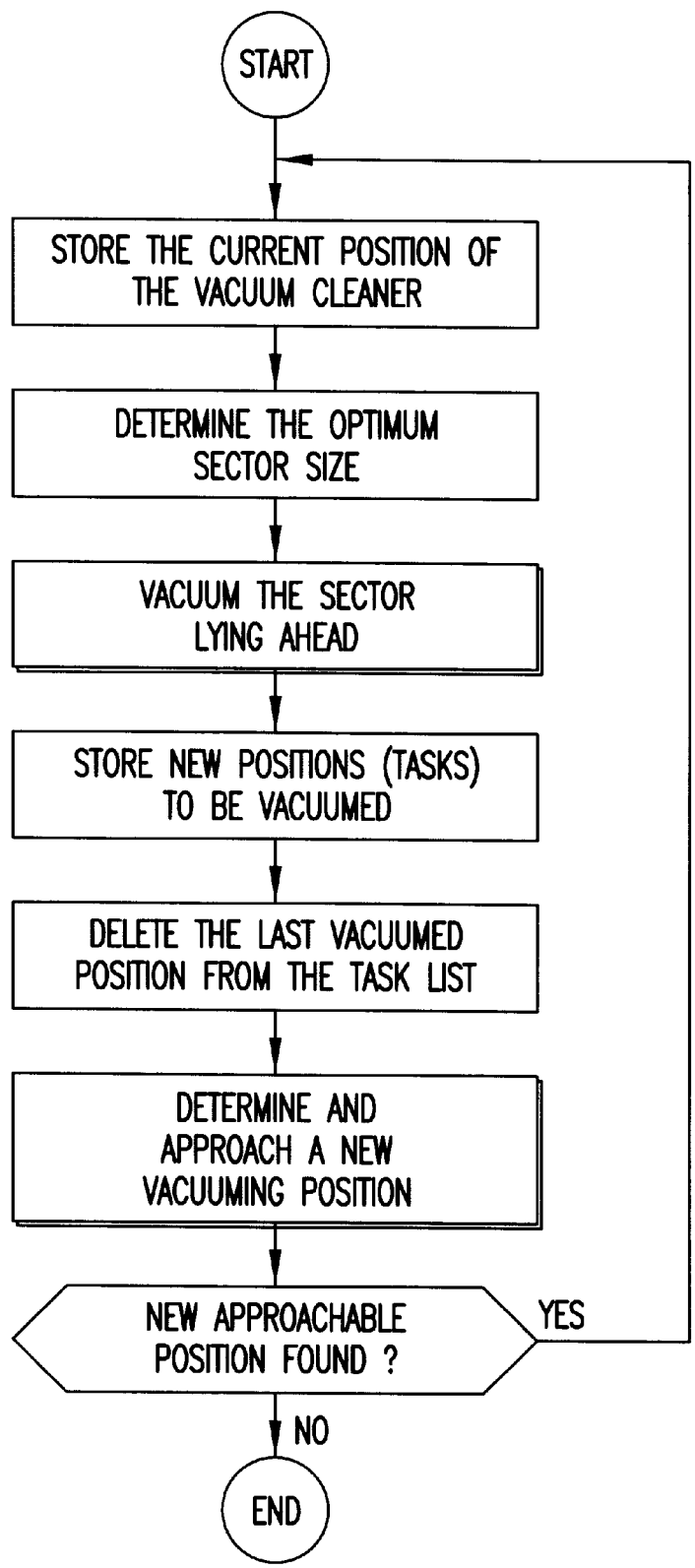
FIG. 10 illustrating the complete flow chart of the controlling method.

The complete flowchart of the vacuum cleaner control is depicted in FIG. 10.

At the beginning of the vacuuming process and always when a new vacuuming position is taken, the current vacuuming position is stored. For a definite localisation, the x- and y-co-ordinates of the center point of the vacuum cleaner, the length of the suction arm and the angle, which the suction arm takes in relation to the x-axis, are required.

Then, the optimum size of the sector to be vacuumed within the maximum borders of the angle of ±90° (proceeding from the previous direction of movement of the vacuum cleaner) and the maximum possible length of the suction arm Rmax, are determined.

For this, it is checked in the vacuuming field, which points still show the state 0, meaning unvacuumed. The area in which these points can be found is marked definitely by the left and the right limiting angle Wl and Wr and the outer-and inner radius Ra and Ri, with Ri meaning the constant length of the arm when retracted.

In the next step, the so defined area of the sector is vacuumed, see section "Vacuuming of a sector", including a respective treatment of obstacles. Every area which is covered, is marked in the cleaning field with the state 1 respectively if an obstacle was detected with state 2.

Now possible new positions of the suction head (tasks) are marked with the state 3 in the vacuuming field as possible starting points for new vacuuming sectors at the free outer borders of the vacuumed area, which are marked by the state 0. In addition to this marking, the storage of each task is carried out with its co-ordinates, its priority and the optimum new direction of vacuuming (rectangular to the respective border) in the list of the still open tasks.

If the vacuum cleaner could be turned to Wl respectively Wr as well as at the vacuuming shadows behind obstacles, the corners will be marked as possible new vacuuming positions. Apart from the lateral borders, the center of each free border area (marked by the fact that the arm can be extended to Ra without contacting an obstacle) is marked. To increase the number of possible vacuuming positions at larger free border areas, apart from the center additional border points are marked, though with the lower priority 2. In FIG. 6, the possible new vacuuming positions in case of a sector without obstacles, and in FIG. 7 in case of a sector with obstacles, are depicted as black arrows (prio 1) respectively as white arrows (prio 2), with the arrowheads illustrating the new direction of vacuuming. The current position of the suction head, from which the last sector was vacuumed, now is deleted from the list of still open tasks.

Then, the position for the vacuuming of the next sector is determined out of all stored tasks and the vacuum cleaner is moved with its head to this point, see chapter "Determination of the next vacuuming sector".

If no new vacuuming position could be found and approached, the cleaning process will be ended; if this is not the case, it will be continued with the storage of the new vacuuming position as described above.

Vacuuming of a Sector

While vacuuming the current sector, whose borders were determined after the approaching of a new position, the method described in the following with its route optimised controlling of the suction head allows the exact scanning of the contours of any object which impedes the movement of the suction arm.

If no obstacles are detected during the sector vacuuming, the movement of the suction head will be carried through as in FIG. 6 illustrated. But if the suction head meets an obstacle while turning or changing the length, it is guided along the obstacle at a close range.

To be able to guide the suction head along already known obstacles and to avoid a multiple detection, the so called angle-field is used, which is initiated anew before each vacuuming of a sector and is used to store the respective maximum radius for each angle of the sector.

At the beginning of the sector vacuuming, the desired radius Rs, which provides the reference length for the suction arm and which is incremented after each turning, is set at the inner radius Ri, which the suction arm takes in its retracted state.

Now, the suction arm is turned towards the left border of the sector Wl, at the most though until meeting an obstacle, afterwards the turning direction is changed.

Figure 12:
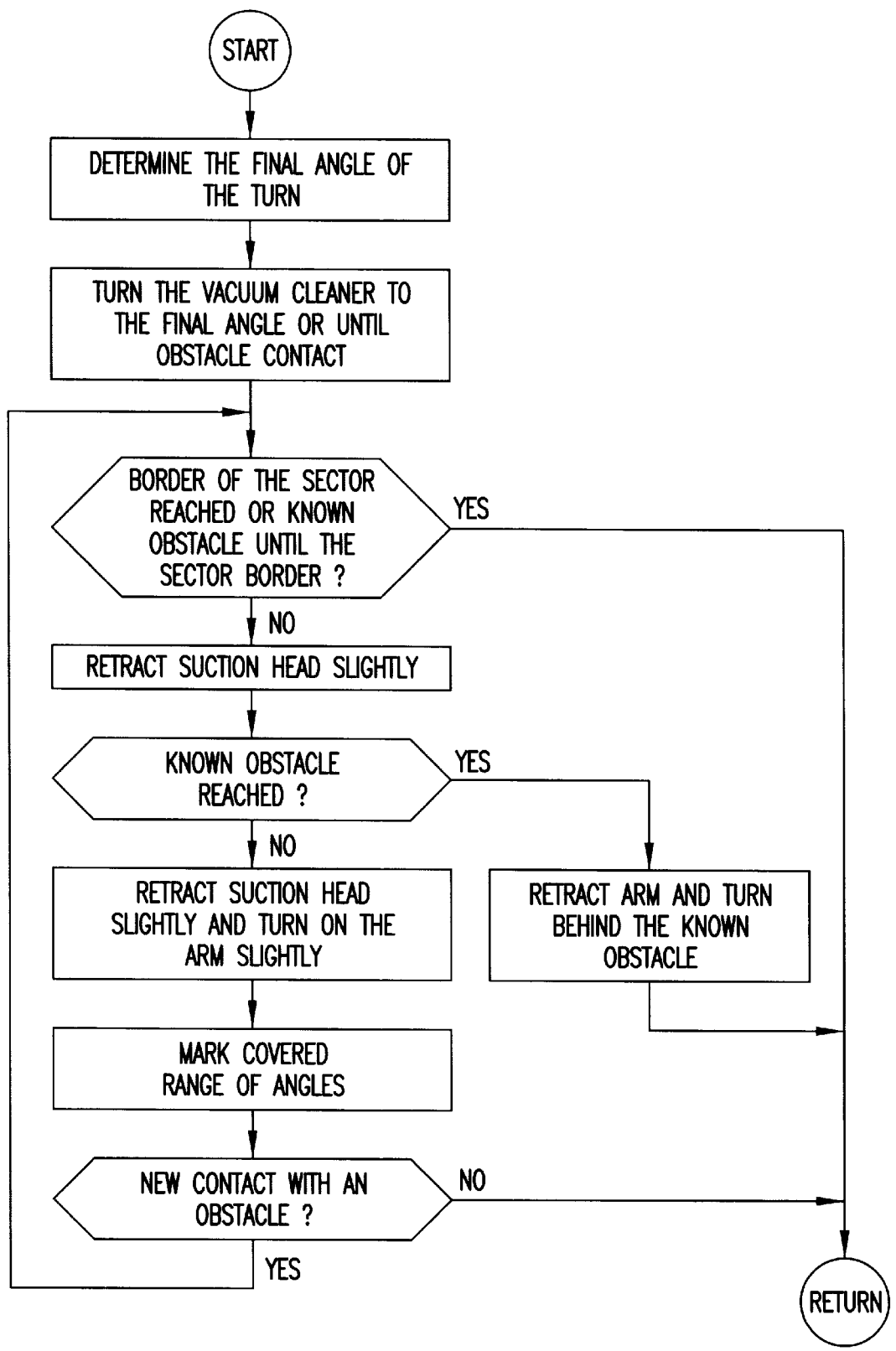
FIG. 12 illustrating the flow chart 'Turning of the vacuum cleaner with possible shortening of the arm', FIG. 13 illustrating the flow chart 'Extension of the arm with possible turning of the vacuum cleaner', and FIG. 14 illustrating the flow chart 'Determination of a new cleaning position'.

Then follows the turning of the vacuum cleaner into the current direction with possible shortening of the length of the arm, see next chapter and FIG. 12. During this procedure, if the determined final angle cannot be reached directly because of an obstacle, it will be tried to continue the turning by shortening the length of the arm step by step while detecting the border contour of the obstacle.

The turning is finished as soon as the suction arm reaches the final angle respectively if it can be turned freely the next step after a necessary shortening of the arm, because then the arm at first has to be lengthened again to follow the contour of the obstacle.

After this, it is checked, if after finishing the turning process the respective sector border could be reached, respectively if all angles up to the sector border are marked with an radius shorter than the current desired radius. Only if at least one of these conditions is fulfilled, the direction of turning will be converted, Rs will be increased by the diameter of the suction head and it will be checked, if Rs is larger than the previously determined outer radius Ra. Since in this case, the outer border of the sector was reached, the suction motor is stopped, the suction arm is retracted to Ri and the vacuuming process is continued as described in FIG. 10 and section "Description of the controlling method".

If this criterion of breaking off is not fulfilled, in the following it is tried to extend the suction arm to Rs, see section "Extension of the arm with possible turning of the vacuum cleaner" and FIG. 13. At this, in case of contact with an obstacle, the turning is continued step by step and then it is tried a new to reach Rs.

This macro ends with reaching Rs respectively if the evaluation of the angle-fields reveals that in the direction of the turning, all accessible areas have already been vacuumed.

Then, it is jumped back to the macro "Turning of the vacuum cleaner with possible shortening of the arm", as described above.

Turning of the Vacuum Cleaner With Possible Shortening of the Arm

As illustrated in FIG. 12, at first the final angle of the turning is calculated, which generally is not identical with the left or right border angle Wl respectively Wr. For this, it is checked if at a previous turn in this direction with a shorter length of the arm an obstacle has already been detected. In this case, a too large turning angle would cause the suction arm to meet an already known obstacle again, though not with the suction head an the here mounted contact sensor, but further behind. The obstacle then could only be detected by the blocking sensor, which releases at distinctly greater forces when pressed against an obstacle than the contact sensor and which is not planned for this use (see "Orientation of the vacuum cleaner with sensors").

Figure 11:
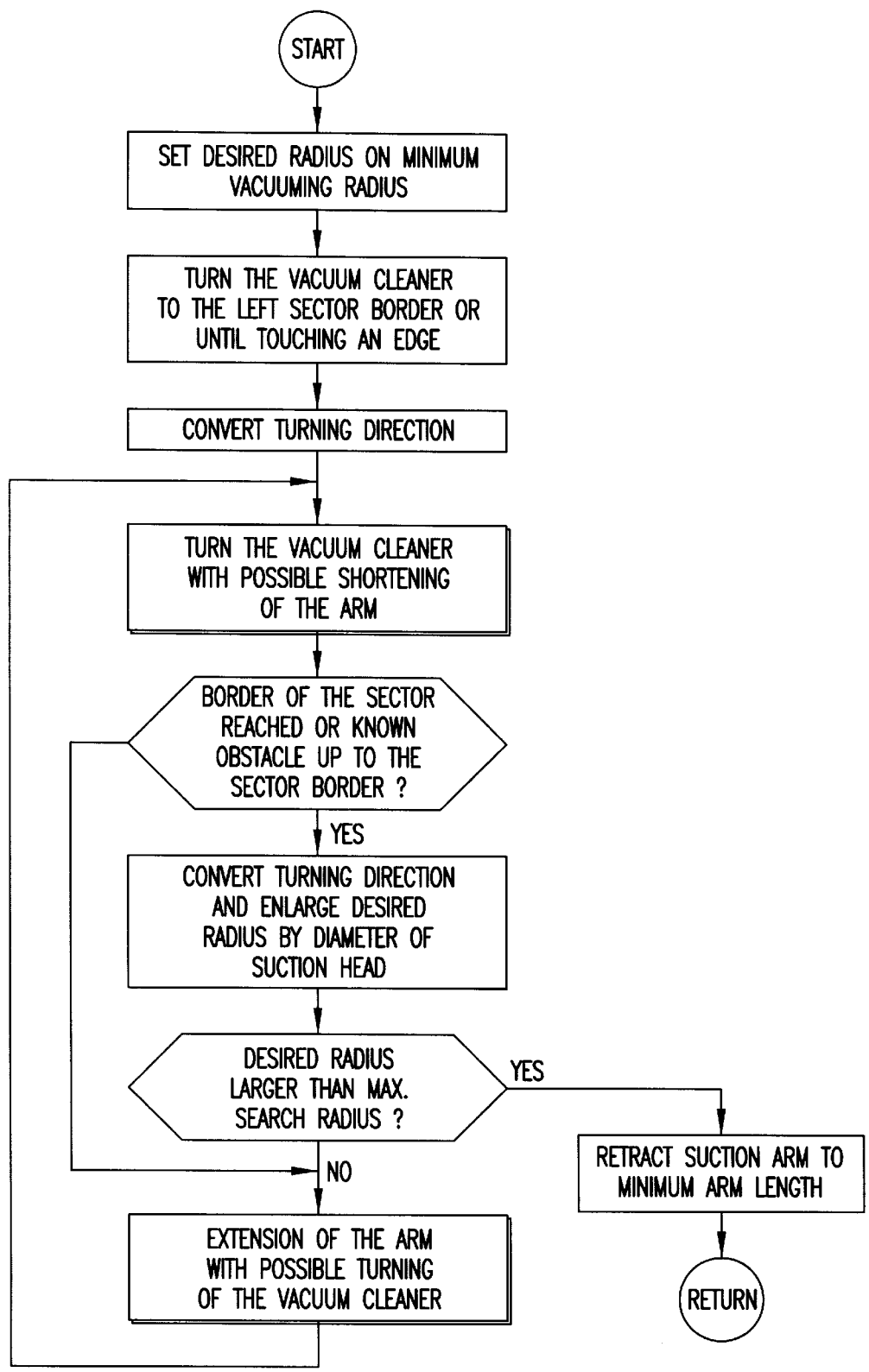
FIG. 11 illustrating the flow chart 'Vacuuming of the sector ahead'.

If after completing of the turning the borders of the sectors Wl respectively Wr have been reached, meaning that no obstacle has occurred, an instant jumping back to FIG. 11 is performed, see the previous section. The jumping back also will be performed if the turning is stopped because of a known obstacle, which reaches up to the border of the sector, because then a continuing of the turning with the current desired radius behind the obstacle is not possible.

If both conditions are not fulfilled, the suction head will be turned back by 1 cm and then the arm is retracted, while it is distinguished between two cases.

If an obstacle which is already known but can be circumvented exists, meaning that the turning can be continued behind the obstacle with the desired radius, the arm will be retracted far enough and turned before the obstacle. After this, the jumping back to the previous flowchart is performed.

If the obstacle is detected with the current desired radius for the first time, its contour will have to be scanned exactly to be able to vacuum the edges at best. Because of that, in this case the length of the arm is shortened only by 1 cm and then it is tried to turn on the head for half the width of the head (though the borders of the sector here form an absolute limit).

The radiuses of the suction arm in the covered angles are then stored in the angle-field.

If the suction arm could be turned half the width of the head without meeting again the obstacle or if the respective border of the sector was reached, it will he jumped back to FIG. 11. If the sensors detect a new obstacle, it will again be checked if a continuing is possible as described above.

Extension of the Arm With Possible Turning of the Vacuum Cleaner

Figure 13:
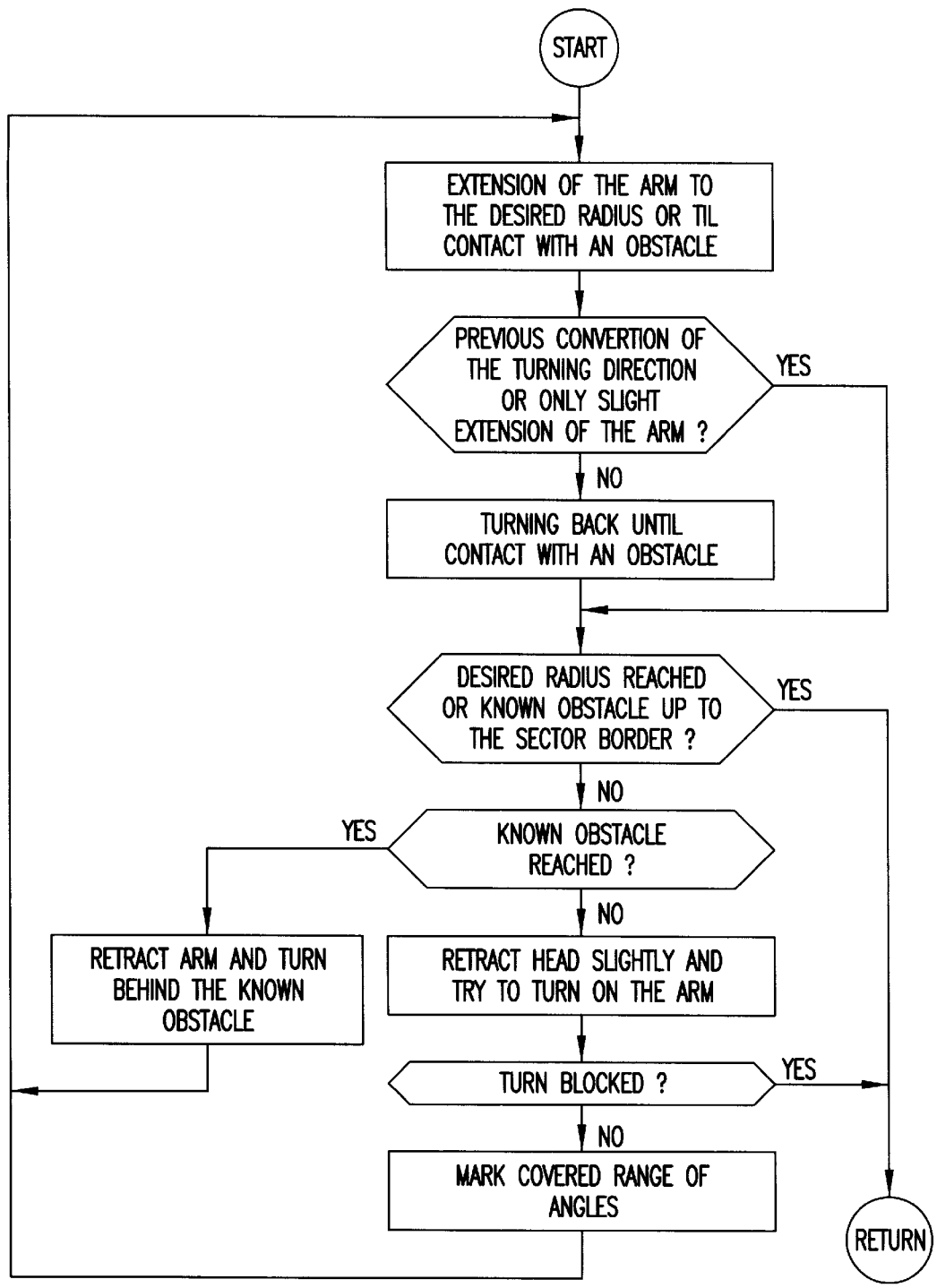

At first it is tried as illustrated in FIG. 13, to extend the suction arm to the current desired angle Rs. The arm is turned back after finishing the extension of the arm against the current direction of turning for at most half the width of the head until the obstacle is met. Since when circumventing an obstacle the turning is performed in multiples of half the width of the head, the turning back is necessary to assure that the contour of the obstacle which has to be circumvented is detected exactly. The turning back has to be performed only if before no change of the turning direction has occurred and even then would only be performed if the suction arm can be extended a certain minimum length.

Then, it will be checked if the desired radius has been reached or if in the angle-field already all following angles in the turning direction are marked with a radius smaller than Rs, thus marking a known obstacle until the border of the sector. In both cases, it is jumped back to FIG. 11.

If a known obstacle lies within the turning direction which does not reach up to the border of the sector, the suction arm then will be retracted as far as necessary, turned past the obstacle and then it will be tried again to extend the arm.

If this is not possible, the suction arm will be retracted slightly until no obstacle is detected anymore by the sensor and turned on half the width of the head. If because of an obstacle no turn has been possible, the jumping back to FIG. 11 will be performed.

If the arm could be turned at least slightly, the covered area in the angle-field would be marked with the respective radiuses, and then follows the jumping back to the extension of the suction arm as described above.

Determination of the Next Vacuuming Position

The main principle to determine the new vacuuming position consist in filtering the optimum task of the current position out of all the open tasks by evaluating different criteria. If no new task is found from the current position, the previous positions of the vacuum cleaner will be examined one after another. If from one of these previous positions, a new vacuuming position can be determined, the vacuum cleaner will be led back to this position, and from there, the new position is approached.

Figure 14:
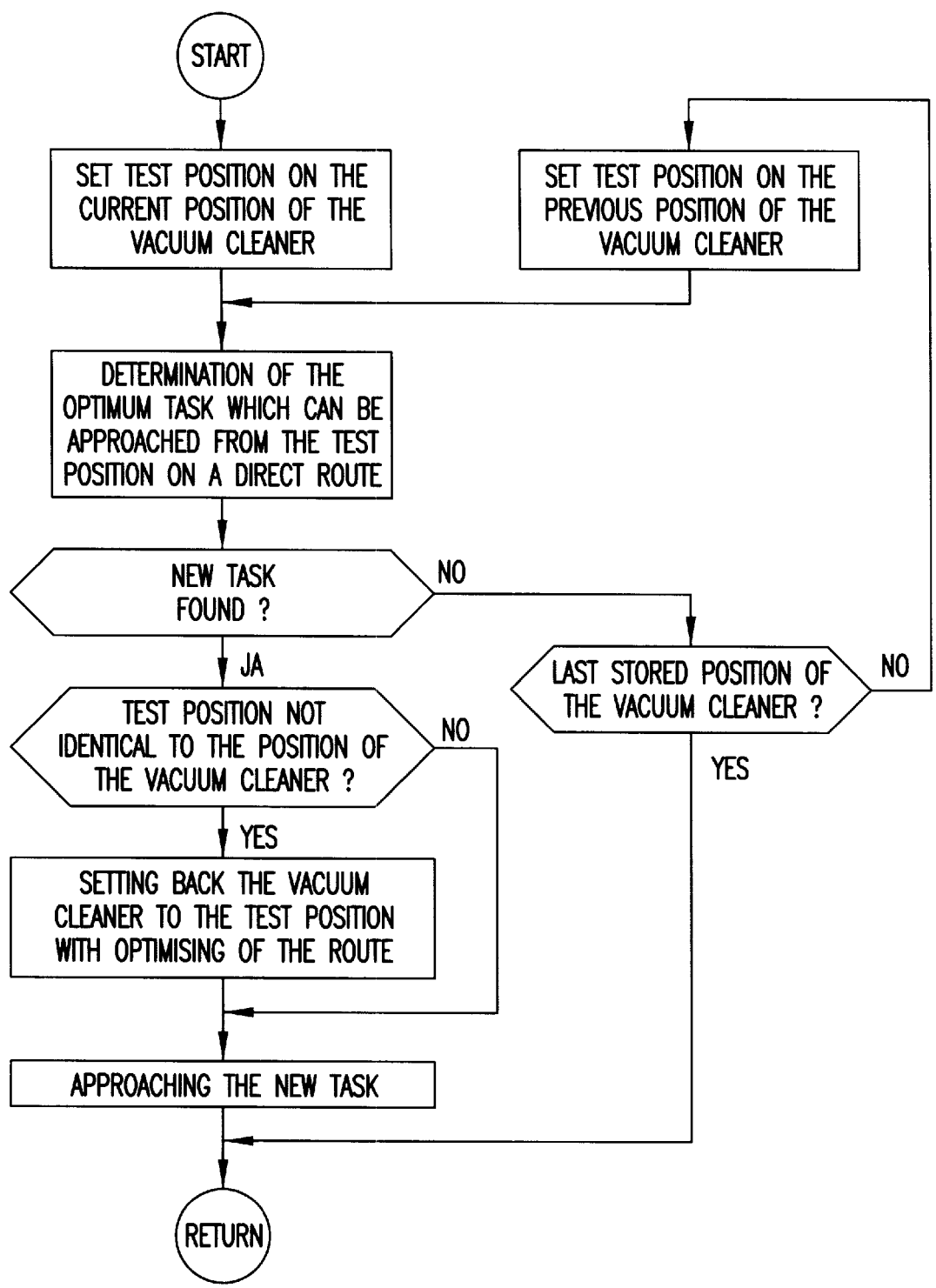

At the beginning of the flow chart in FIG. 14, the test position is set on the current position of the vacuum cleaner. Then, all the stored tasks will be run through and checked if they are suitable as a possible continuing step.

The following evaluations in the here mentioned sequence are performed:

At first, by means of the state in the vacuuming field it will be checked, if the stored position has been already vacuumed. In this case, the respective task is rejected and deleted.

If a possible candidate for the new position has already been chosen, only such tasks will be evaluated, which show at least the same priority, see chapter "Description of the controlling method". If this condition is fulfilled, then the distance of the task from the current test position will be calculated and by means of the states in the cleaning field, it will be checked, if the vacuum cleaner with its head can be moved to this position on a direct route. For this, the whole route which has to be covered by the vacuum cleaner has to be marked with the state 1 and it has to be possible that the task can be reached at least by extending the arm.

Of all positions which can be approached, that one is selected, whose priority is higher than the one of the priorities already selected, or which possesses a higher value of the x co-ordinate if the priorities are equal. By this criterion it is guaranteed that the area which is to be cleaned always is cleaned from back to front.

If after checking all stored tasks, no approachable position could be found, the test position will be set back on the respective previous position of the vacuum cleaner, from where again a loop over all tasks is performed.

If from none of the former positions of the vacuum cleaner a continuing is possible, either because all of the tasks have been accomplished or because the still open tasks cannot be reached by the vacuum cleaner, the vacuuming process will break off.

If this is not the case, it will be checked, if the test position, from where a task has been found, is identical to the current position of the vacuum cleaner. While in this case, the new position can be approached directly after the turning of the vacuum cleaner in the respective direction, in all other cases, the vacuum cleaner has to be set back to the test position at first.

At this, during several operations of setting-back which have to be carried through, an optimising of the route is performed by checking for each position in between, if it can be skipped and if the vacuum cleaner possibly can be moved back directly from its current position to the position from which then is taken the new vacuuming position. Condition for a possible "short-cut" again is the fact that the vacuum cleaner only may traverse areas, which are marked in the vacuuming-field with the state 1 to avoid a collision with obstacles. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of automatically controlling a self-moving device with range and contact-sensors, the method comprising the steps of:

individually determining and scanning a closer area around the device by using a movable arm on the device;

storing possible new positions at the border of the closer area;

the determination of the closer area and a selection of a new position is realized mainly on a basis of information of surroundings of the device which is stored in a data field and updated in each step to determine a next position;

optimizing a position to move the device by calculating and comparing each stored position which can be approached by the device by calculating and comparing for each of these positions certain evaluation parameters including distances or areas in reach of a possible new position which have not yet been scanned and by selecting the position with best evaluation results; and moving the device to a new position until no further position can be selected.

2. The method as claimed in claim 1, wherein the method is used with a vacuum cleaner.

3. The method as claimed in claim 1, further comprising the step of determining under consideration of the scanning direction, an exact position of an obstacle when an obstacle is detected by a sensor on the device.

4. The method as claimed in claim 1, wherein after the scanning of the closer area, new positions are stored only where no obstacles have been detected and also where no area borders which have already been scanned before from a previous position of the device.

5. The method as claimed in claim 1, further comprising the step of updating every state of an area when scanning the area already marked in the data field, the state being updated according to the new sensor data.

6. The method as claimed in claim 1, further comprising the step of taking only positions which in the data field are not marked as already scanned into consideration when selecting a new position for the device.

7. The method as claimed in claim 1, further comprising the step of assigning different priorities to new positions when storing the new positions, and wherein when selecting a new position for the device, only such positions are considered whose priorities are not inferior to that of a position already preliminarily selected in a current step.

8. The method as claimed in claim 1, further comprising the step of taking only such positions into consideration which are located within a certain partial area when selecting a new position, and wherein the partial area is modified during the method, if within the current partial area no new positions can be selected.

9. The method as claimed in claim 1, further comprising the step of taking at lease one of distance and direction between possible new positions and a current position into consideration when selecting a new position.

10. The method as claimed in claim 1, further comprising the step of taking a covered distance since the storage of a position is taken into consideration when selecting a new position.

11. The method as claimed in claim 1, further comprising the step of allowing only areas to be traversed which have already been scanned and which are not marked as an obstacle when selecting a new position for the device to guarantee by evaluation of the data field that the new position can be reached by the device on a direct route.

12. The method as claimed in claim 1, wherein after selection of a new position, by evaluating the data field, a shortest route to the new position within the already scanned area under circumvention of obstacles is determined and whereafter the device is moved along the route.

13. The method as claimed in claim 1, further comprising the step of setting the device back to any previous position and wherein in setting back the device over several previous positions, certain positions in between can be skipped, if the evaluation of the data field reveals that the device does not need to traverse areas which are marked as an obstacle while moving.

14. The method as claimed in claim 1, further comprising the step of detecting contours of an unexpected obstacle which blocks movement of the device, the contours being detected by scanning the obstacle with sensors on the device.

15. The method as claimed in claim 1, further comprising the step of determining a new closer area by evaluating the data field when approaching a new position so that only a small overlap with already scanned neighboring areas occurs.

16. The method as claimed in claim 1, further comprising the step of cleaning a floor surface with the movable arm during the step of scanning.

17. The method as claimed in claim 16, wherein by evaluating information in the data field, the cleaning of floor surface is performed only in those areas, which are marked as not yet cleaned in the data field.

18. The method as claimed in claim 1, further comprising the step of guiding the movable arm along a detected obstacle at the smallest possible range during the step of scanning.

19. The method as claimed in claim 1, wherein the scanning movable arm in the closer area around the device is selected in form of a sector of a circle.

20. The method as claimed in claim 1, further comprising the step of repeatedly turning the device from left to right during the step of scanning and also increasing a length of the movable arm at each turn.

21. The method as claimed in claim 1, further comprising the step of repeatedly turning the device from left to right during the step of scanning and also increasing a length of the movable arm at each turn, the repeated scanning of already detected obstacles being prevented by shortening the length of the arm in a range of those angles where an obstacle has already been detected.

22. The method as claimed in claim 1, wherein the device has a suction engine and wherein the engine is only turned on when vacuuming closer areas and not during movement of the device towards a new position.

23. A method of automatically controlling a self-moving device with range and contact sensors, the method comprising the steps of:
    scanning a closer area in a form of a sector of a circle around the device, the scanning being by a movable arm;
    turning the arm from left to right during the scanning and increasing a length of the arm at each turn, the arm starting at a retracted state during the scanning and the scanning continuing until a given maximum arm length is reached by the arm whereafter following the last turn, the arm is retracted; and
    moving the device to a new position and repeating the scanning.

24. The method as claimed in claim 23, wherein the method is used with a vacuum cleaner.

25. The method as claimed in claim 23, further comprising the step of cleaning a floor surface with the movable arm during the step of scanning.

26. The method as claimed in claim 23, further comprising the step of using the movable arm for scanning so that not yet scanned areas are covered first by a front end of the arm.

27. The method as claimed in claim 23, further comprising the step of guiding the movable arm along a detected obstacle at the smallest possible range during the step of scanning.

28. The method as claimed in claim 23, further comprising the step of repeatedly turning the device from left to right during the step of scanning and also increasing a length of the movable arm at each turn, the repeated scanning of already detected obstacles being prevented by shortening the length of the arm in a range of those angles where an obstacle has already been detected.

29. The method as claimed in claim 23, wherein the device has a suction engine and wherein the engine is only turned on when vacuuming closer areas and not during movement of the device towards a new position.

30. A device comprising:
    propelled wheels, at least one of the propelled wheels being steerable;
    sensors; and
    an extensible arm having a front end and a rear end, the extensible arm having a head positioned at the front end, the head being a support in addition to the at least one propelled wheels, the head including at least one of rollers, balls, wheels or bristles.

31. The device as claimed in claim 30, wherein the device is a vacuum cleaner.

32. The device as claimed in claim 30, wherein the at least one propelled wheel includes two wheels and the device is supported by the head and the two propelled wheels.

33. The device as claimed in claim 30, wherein the arm is a telescopic arm.

34. The device as claimed in claim 30, wherein a resting-pressure of the head is varied by shifting weight of the device.

35. A device comprising:
    propelled wheels, at least one of the propelled wheels being steerable;
    sensors; and
    an extensible arm having a front end and a rear end, the extensible arm having a head positioned at the front end, at least one propelled circular brush being positioned at the head.

36. The device as claimed in claim 35, wherein the device is a vacuum cleaner.

37. The device as claimed in claim 35, wherein the at least one propelled wheel includes two wheels and the device is supported by the head and the two propelled wheels.

38. The device as claimed in claim 35, wherein the arm is a telescopic arm.

39. The device as claimed in claim 35, wherein the arm is a telescopic arm, which at the rear end is mounted rotatably about a horizontal axis and is vertically flexible.

40. The device as claimed in claim 35, wherein the at least one brush is driven, using a movable shaft driven by a motor positioned on a base of the device.

41. The device as claimed in claim 40, wherein the shaft is longitudinally movable relative to the base of the device.

42. The device as claimed in claim 35, wherein the at least one brush has bristles which are positioned diagonally towards an inner part of the brush and which are surrounded by a circle of soft bristles which are positioned diagonally towards an outer part of the brush.

43. A device comprising:

propelled wheels, at least one of the propelled wheels being steerable;

sensors including a contact sensor, a step sensor and a height sensor; and an extensible arm having a front end and a rear end, the extensible arm having a head positioned at the front end, the contact sensor being positioned at the head and detecting obstacles for movement of the arm, and the step sensor and the height sensor being positioned at the head and being used to detect obstacles which fail to block the arm, but which block movement of the device.

44. The device as claimed in claim 43, wherein the device is a vacuum cleaner.

45. The device as claimed in claim 43, wherein the arm is a telescopic arm.

46. The device as claimed in claim 43, wherein the arm is a telescopic arm, which at the rear end is mounted rotatably about a horizontal axis and is vertically flexible.

47. The device as claimed in claim 43, wherein the contact sensor has two electrical conductors positioned within a short distance to each other around the head of the arm, from which the outer conductor is pressed elastically against the inner conductor when touching an obstacle, thus closing an electrical circuit.

48. The device as claimed in claim 43, wherein the height sensor uses at least one of ultrasonic or electromagnetic waves to measure a clearance height above the head.

49. The device as claimed in claim 43, wherein the step sensor is mechanical push button or contact-free sensor for detecting steps in a floor surface.

* * * * *

UNITED STATES PATENT AND TRADEMARK OFFICE
CERTIFICATE OF CORRECTION

PATENT NO. : 6,370,453 B2
DATED : April 9, 2002
INVENTOR(S) : Volker Sommer

It is certified that error appears in the above-identified patent and that said Letters Patent is hereby corrected as shown below:

<u>Title page,</u>
Item [76], Inventor, please correct the inventor's address from "Schwabsledler Weg 6, 13503 Berlin (DE)" to -- Schwabstedler Weg 6, 13503 Berlin (DE) --

Signed and Sealed this

Twelfth Day of November, 2002

*Attest:*

JAMES E. ROGAN
*Director of the United States Patent and Trademark Office*

*Attesting Officer*

UNITED STATES PATENT AND TRADEMARK OFFICE
CERTIFICATE OF CORRECTION

PATENT NO.    : 6,370,453 B2                                                Page 1 of 1
DATED         : April 9, 2002
INVENTOR(S)   : Volker Sommer It is certified that error appears in the above-identified patent and that said Letters Patent is hereby corrected as shown below:

<u>Title page,</u>
Item [76], Inventor, please correct the inventor's address from "Schwabsledler Weg 6, 13503 Berlin (DE)" to -- Schwabstedter Weg 6, 13503 Berlin (DE) --

This certificate supersedes Certificate of Correction issued November 12, 2002.

Signed and Sealed this

Second Day of December, 2003

JAMES E. ROGAN
*Director of the United States Patent and Trademark Office*